Dec. 3, 1963 TSUNEKICHI KUSHIGEMACHI ETAL 3,113,254
INSTANT BRAKE TYPE ELECTRIC MOTOR
Filed March 11, 1958

INVENTORS
TSUNEKICHI KUSHIGEMACHI
YOSHIYUKI WATANABE
BY
ATTORNEYS

United States Patent Office 3,113,254
Patented Dec. 3, 1963

3,113,254
INSTANT BRAKE TYPE ELECTRIC MOTOR
Tsunekichi Kushigemachi, 713-banchi, Yukigaya-machi, Ota-ku, and Yoshiyuki Watanabe, 63-banchi, Higashi Tamagawa-machi, Setagaya-ku, both of Tokyo, Japan
Filed Mar. 11, 1958, Ser. No. 720,725
1 Claim. (Cl. 318—379)

The present invention relates to instant brake type electric motor and more particularly to the motor of which the stopping or starting may be done electrically with instantaneous quickness and exact effect, not by any mechanical mechanism.

In commutator type single phase alternating current electric motors, although the series type or repulsion type motors are employed for practical use widely as the motors having great starting torque, in case to desire to use the motor for instantaneous stopping, there have been no way other than to equip some mechanical apparatus etc. and thus to depend on the external power, because there is no electrical brake action in those motors by the interruption of the electric source, and so, never had not accomplished the purpose of ideal quick stopping from the standpoint of inertia of motion. And, as they are not proper as the motors for the purpose which requires a great degree of the frequent starting and stopping, nothing could be done but to continue the present state up to-day in the specific business circle as in sewing machine, automatic telephone, spinning machinery, etc., without such proper motors, suffering a great deal of inconvenience and disadvantages.

In the shunt type motors, there is as great phase difference as about 90° between the current of the stator and that of the rotor, the torque becomes very small, so the less practical value for electric motors, and does not come to employ these to-day.

According to the present invention, starting or stopping of the electric motor are done electrically with instantaneous quickness and exact effect, not by any mechanical mechanism. In the commutator type motor, the transcendental phenomena occasioned in the circuit of the same at the instant of interrupting the electric source is utilised to induce a direct current potential in the rotor of the said motor, direct current flows in the stator windings by this direct current potential, increases the magnetic flux in the stator quickly, calls self induction of the magnetic flux, thus, the electrical brake action will result by the mutual action of the said magnetic flux and the current of the electric motor.

Further features and advantages of the invention will become apparent in view of the following detailed description of a preferred embodiment with reference to the accompanying drawings, in which.

Figure 1:
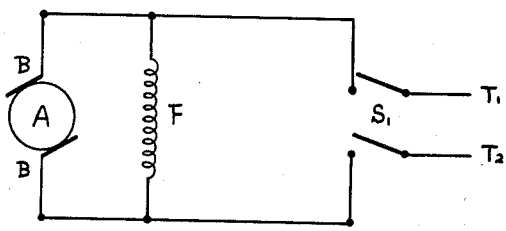
FIG. 1 is schematic wiring diagram of the commutator type shunt winding electric motor.
Figure 2:
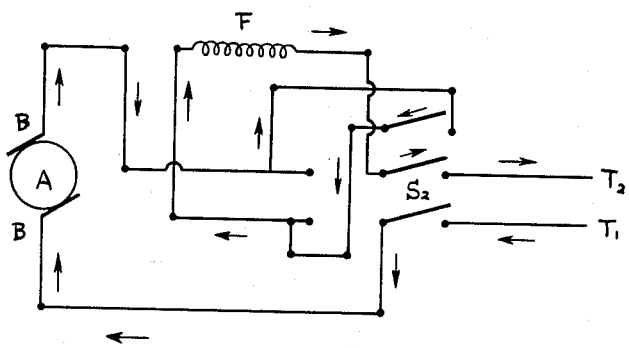
FIG. 2 is also a schematic wiring diagram of the commutator type series winding electric motor.
Figure 3:
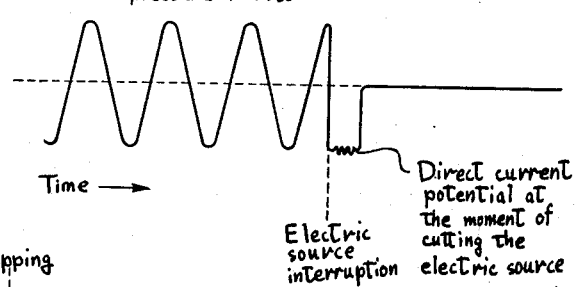
FIG. 3 shows an electromagnetic oscillogram of direct current potential produced in the rotor at the instant of cutting off the electric source in the electric motor according to the present invention.
Figure 4:
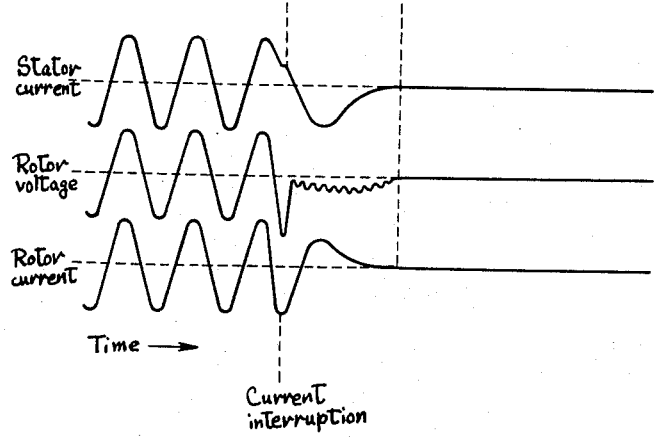
FIG. 4 shows an electromagnetic oscillogram at the instant of brake action in FIG. 3.

With reference to the drawings, in the commutator type single phase alternating current electric motor, connecting the stator winding F in parallel with the rotor A with the help of commutating brushes B, B in FIG. 1, or short circuiting the circuit of the series winding motor based on the composition of the parallel circuit by a switch $S_2$ in FIG. 2, increasing the number of windings for the rotor and decreasing the same for the stator, and at the same time decreasing the electric resistance thus decreasing a time constant, or equalising the impedances both in the stator and in the rotor, or drawing the same quite near each other to compose to introduce a self excitation from the self excitation characteristics of induced current in the stator and the produced potential in the rotor for a wide range of number of revolutions, from the maximum number to zero revolution of the motor, at the instantaneous transition moment of interrupting the electric source, the residual magnetism still exists in the stator, a direct current potential be induced in the rotor by the said magnetic flux as shown in the graph of FIG. 3, direct current flows quickly in the stator windings having small resistance and small time-constant, results in self generating action and as shown in FIG. 4 the rotor stops its rotation quickly and exactly at the instant of cutting off the electric source, by the brake action of stator flux and rotor current. As the experimental result in case of the motor of $\frac{1}{10}$ h.p., 100 v., 50 cycles, a quick stop within $\frac{1}{10}$ second has been shown, so, not only very effective for the uses to the machineries such as sewing machine, spinning machine, etc. which requires frequent starting and stopping, also, eliminates the demerits of inability of the shunt type motor by minimizing the phase difference, drawing the values of impedance of the stator current and that of the rotor current near each other, increasing the torque, and increasing the brake capacity too. Thus the purpose of the present invention may be attained perfectly, and much greater advantages can be expected by applying the principle of the present invention to the commutator type series winding electric motors.

What we claim is:

An A.C. motor having instantaneous braking characteristics comprising a rotor, a stator, and switch means operable to a first and a second position; said switch means when in said first position connecting said rotor and said stator in electrical series combination; said switch means when in said first position also being adapted to electrically connect said series combination to an A.C. energizing source for said motor; said switch means when in said second position isolating said motor from its energizing source so that no current flows therefrom to said motor; said switch means when in said second position also connecting said rotor in electrical parallel with said stator whereby, when said rotor is rotating, a direct current is induced in said rotor for substantially instantaneous braking of said motor, said rotor and said stator being constructed to have substantially equal impedances thereby obtaining a short braking time when the switch means is in the second position.

References Cited in the file of this patent

UNITED STATES PATENTS

| | | |
|---|---|---|
| 2,691,126 | Jeffers | Oct. 5, 1954 |
| 2,726,363 | Scully | Dec. 6, 1955 |
| 2,784,366 | Steele | Mar. 5, 1957 |

OTHER REFERENCES

Single Phase Commutator Motor, by Creedy, published in 1913 by Constable and Co., Ltd., London, England.